United States Patent
Bielby

(10) Patent No.: US 11,840,246 B2
(45) Date of Patent: Dec. 12, 2023

(54) SELECTIVELY ENABLE OR DISABLE VEHICLE FEATURES BASED ON DRIVER CLASSIFICATION

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 491 days.

(21) Appl. No.: 16/915,969

(22) Filed: Jun. 29, 2020

(65) Prior Publication Data

US 2021/0403017 A1     Dec. 30, 2021

(51) Int. Cl.
| | |
|---|---|
| *G06V 20/59* | (2022.01) |
| *B60W 50/08* | (2020.01) |
| *B60W 40/08* | (2012.01) |
| *G06N 3/08* | (2023.01) |

(52) U.S. Cl.
CPC ......... *B60W 50/085* (2013.01); *B60W 40/08* (2013.01); *G06N 3/08* (2013.01); *G06V 20/597* (2022.01); *B60W 2040/0809* (2013.01); *B60W 2540/043* (2020.02); *B60W 2540/24* (2013.01)

(58) Field of Classification Search
CPC ............... B60W 50/085; B60W 40/08; B60W 2040/0809; B60W 2540/043; B60W 2540/24; G06N 3/08; G06V 20/597; B60K 28/06; B60K 28/066; B60K 28/063
See application file for complete search history.

(56) References Cited

U.S. PATENT DOCUMENTS

| | | |
|---|---|---|
| 10,004,431 B2 | 6/2018 | Shuster et al. |
| 10,322,728 B1* | 6/2019 | Porikli ................. G06V 10/764 |
| 10,471,969 B1 | 11/2019 | Laserra Lima |
| 11,059,492 B2 | 7/2021 | Govindjee et al. |
| 2014/0310788 A1* | 10/2014 | Ricci .................... G06V 40/166 726/6 |
| 2016/0318521 A1* | 11/2016 | Nothacker ............. A61B 5/082 |
| 2020/0363220 A1 | 11/2020 | Simoudis |
| 2021/0403019 A1 | 12/2021 | Kim |
| 2021/0403052 A1 | 12/2021 | Bielby |

OTHER PUBLICATIONS

Gonfalonieri, Alexandre. "How to Build A Data Set For Your machine Learning Project." Towards Data Science, 2019.

* cited by examiner

*Primary Examiner* — Kenneth J Malkowski
(74) *Attorney, Agent, or Firm* — Greenberg Traurig

(57) ABSTRACT

A vehicle or a mobile device within or near the vehicle can have multiple sensors to sense biometric features of a user or driver, and electronic circuitry (such as a computing system) can classify the user or driver according to the sensed biometric features. Also, non-biometric factors of the user or driver or of the mobile device of the user or driver can be used to classify the user or driver, e.g., MAC address, RFID, username and password, PIN, etc. Also, factors from interaction with a user interface of the vehicle or the mobile device can be used to classify the user or driver. Such features and factors can be used alone or in combination for the classification, and the classification can use AI (such as an ANN). The vehicle or the mobile device can then selectively enable or disable features of the vehicle based on the classification.

15 Claims, 6 Drawing Sheets

400

```
┌─────────────────────────────────────────────────────────────────────────────┐
│ sensing, by at least one sensor, at least one biometric feature of a user of a vehicle │
│ (the vehicle having one or more first features in operating the vehicle and at least one second feature in │
│                         operating the vehicle)                              │
│                                  402                                        │
└─────────────────────────────────────────────────────────────────────────────┘
```

```
┌─────────────────────────────────────────────────────────────────────────────┐
│ generating and sending, by the at least one sensor, biometric data of the at least one biometric feature of the │
│       user according to at least the sensed at least one biometric feature  │
│                                  404                                        │
└─────────────────────────────────────────────────────────────────────────────┘
```

```
┌─────────────────────────────────────────────────────────────────────────────┐
│        receiving, by electronic circuitry, the biometric data from the at least one sensor │
│                                  406                                        │
└─────────────────────────────────────────────────────────────────────────────┘
```

```
┌─────────────────────────────────────────────────────────────────────────────┐
│   determining, by the electronic circuity, a classification of the user based on the biometric data │
│                                  408                                        │
└─────────────────────────────────────────────────────────────────────────────┘
```

```
┌─────────────────────────────────────────────────────────────────────────────┐
│ determining, by the electronic circuitry, whether to enable or disable the second feature for the user operating │
│             the vehicle with the first features based on the classification │
│                                  410                                        │
└─────────────────────────────────────────────────────────────────────────────┘
```

```
┌─────────────────────────────────────────────────────────────────────────────┐
│   enabling or disabling, by at least the electronic circuity, the second feature according to │
│                         the determination at step 410                       │
│                                  412                                        │
└─────────────────────────────────────────────────────────────────────────────┘
```

```
sensing, by at least one sensor, at least one biometric feature of a user of a vehicle
502
          ↓
generating and sending, by the at least one sensor, biometric data of the at least one biometric feature of
the user according to at least the sensed at least one biometric feature
504
          ↓
initially restricting, by electronic circuitry, the user from using at least one certain feature of the vehicle
506
          ↓
receiving, by the electronic circuitry, the biometric data from the at least one sensor
508
          ↓
determining, by the electronic circuity, a classification of the user based on the biometric data
510
          ↓
subsequently permitting the user to use the at least one certain feature or continuing to restrict the user
from using the at least certain feature according to the determined classification
512
```

FIG. 5

SELECTIVELY ENABLE OR DISABLE VEHICLE FEATURES BASED ON DRIVER CLASSIFICATION

FIELD OF THE TECHNOLOGY

At least some embodiments disclosed herein relate to selectively enabling or disabling vehicle features based on user or driver classification.

BACKGROUND

Advanced driver-assistance systems (ADAS) are electronic systems that help a driver of a vehicle while driving. ADAS provide for increased car safety and road safety. ADAS systems use electronic technology, such as electronic control units and power semiconductor devices. Most road accidents occur due to human error; thus, ADAS, which automates some control of the vehicle, can reduce human error and road accidents. ADAS have been designed to automate, adapt and enhance vehicle systems for safety and improved driving. Safety features of ADAS are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, provide pedestrian crash avoidance mitigation (PCAM), alert driver to other cars or dangers, provide a lane departure warning system, provide automatic lane centering, show field of view in blind spots, or connect to navigation systems.

Besides cars and trucks, ADAS or analogous systems can be implemented in vehicles in general. And, such vehicles can include boats and airplanes, as well as vehicles or vehicular equipment for military, construction, farming, or recreational use. Vehicles can be customized or personalized via vehicle electronics and ADAS.

Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery. Related elements for control of electrical vehicular systems are also found in hybrid and electric vehicles such as hybrid or electric automobiles. For example, electric cars can rely on power electronics for main propulsion motor control and managing the battery system.

For ADAS and other types of vehicle systems, vehicle electronics can be distributed systems. And, distributed systems in vehicles can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems. A vehicle using automation for complex tasks, including navigation, may be referred to as semi-autonomous. A vehicle relying solely on automation can be referred to as autonomous. Society of Automotive Engineers (SAE) has categorized autonomy in to six levels. Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. And, level 5 or full autonomy, wherein the vehicle can complete a travel autonomously in any environmental conditions.

BRIEF DESCRIPTION OF THE DRAWINGS

The present disclosure will be understood more fully from the detailed description given below and from the accompanying drawings of various embodiments of the disclosure.

FIGS. 4 to 6 illustrate flow diagrams of example operations that can be performed by aspects of the networked system depicted in FIGS. 1 to 3, in accordance with some embodiments of the present disclosure.

DETAILED DESCRIPTION

Figure 1:
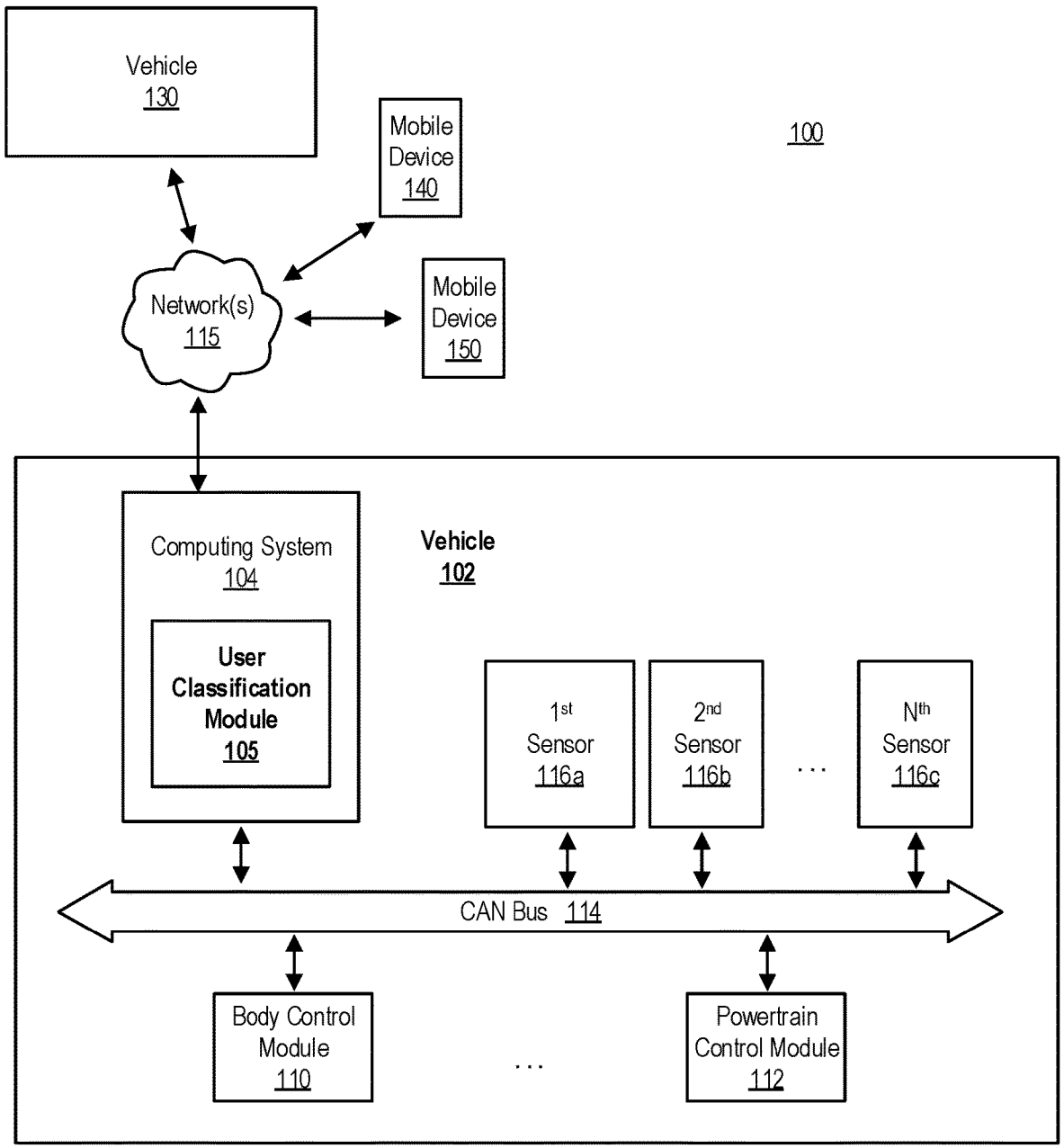
FIGS. 1 to 3 illustrate an example networked system that includes at least mobile devices and vehicles and that is configured to implement selective enabling or disabling of vehicle features based on user or driver classification, in accordance with some embodiments of the present disclosure.

At least some embodiments disclosed herein relate to selectively enabling or disabling vehicle features based on user or driver classification. A vehicle or a mobile device within or near the vehicle can have multiple sensors to sense biometric features of a user or driver, and electronic circuitry (such as a computing system) can classify the user or driver according to the sensed biometric features. Also, non-biometric factors of the user or driver or of the mobile device of the user or driver can be used to classify the user or driver of the vehicle, e.g., MAC address, RFID, username and password, PIN, etc. Also, factors from user interaction, by the user or driver, with a user interface of the vehicle or the mobile device can be used to classify the user or driver. Such features and factors can be used alone or in combination with each other for classification of the user or driver, and the classification of the user or driver can use artificial intelligence (such as an artificial neural network (ANN)). Machine learning also can be used to enhance the AI.

The vehicle or the mobile device can then selectively enable or disable features of the vehicle based on the determined classification of the user or driver. For example, when the driver is determined to be intoxicated or tired, a set of features can be activated or deactivated accordingly. Also, for example, features can be enabled or disabled based on the determined age of the user or driver. For example, if a user or driver is determined to be under a certain age, a set of features can be activated or deactivated accordingly.

Many different aspects of human physiology, chemistry or behavior can be used for biometric classification of the user or driver. For example, the vehicle or the mobile device can use the user or driver's behavior to determine a classification of the user or driver. A driver responding to signals slower may be tired or intoxicated; and, thus, can be classified as a tired or intoxicated driver. And, aspects of the vehicle can be adjusted to accommodate a driver with a slower reaction time. Sensors (such as biometric sensors) can detect features of a user for classification. Also, user interfaces can provide information on a user or driver's classification via user interactions with the UI. A user interface (UI) can include a tactile UI (touch), a visual UI (sight), an auditory UI (sound), an olfactory UI (smell), an equilibria UI (balance), or a gustatory UI (taste), or any combination thereof. Once such information is received, electronic circuitry (e.g., a computing system having a user classification module) can determine one or more classifications of the user or driver from the received data. Based on the determined classification(s), the vehicle or a mobile device of the user or driver can then selectively enable and/or disable certain features of the vehicle.

A classification of a user or driver can be a demographic classification, a psychographic classification, etc. The classification can be based on demographic and/or psychographic data associated with the driver or user. A classification of a user or driver can be can be age-based, disability-based, health-based, behavior-based, etc. A classification an age, an age range, a level of alertness, a range of levels of alertness, an intoxication level, a range of levels of intoxication, a driving style or category, and a range or group of driving styles or categories (e.g., driver under legal age to drive, driver under eighteen, driver under twenty-one, a slightly intoxicated driver, a drunk driver, a drowsy driver, an alert driver, an economic driver, an aggressive driver, a fast driver, a slow driver, a cautious driver, an overly cautious driver, etc.).

Also, a user classification can be based or weighted by the user or driver's experience driving the vehicle. For example, classification may be a greater factor in the selective enable or disable of vehicle features if the user is relatively new to the vehicle. On the other hand, if the vehicle is relative new, classification may be a greater factor in the selective enable or disable of vehicle features. This is beneficial because the system can at first generalize about a driver via classification(s) and then with time learn the individual qualities of the driver to selectively enable or disable vehicle features. Thus, a classification can be a new driver, wherein the vehicle determines the driver lacks extensive driving experience or at least extensive driving experience with the vehicle. For example, a new driver may steer, accelerate, or deaccelerate the vehicle too hard or too soft. Once a driver is determined to be new and determined to be a hard or soft driver for example, the vehicle can compensate accordingly so that the actual movement of the vehicle is more normal or that of an experience driver. Also, for example, for a driver who has a lead foot, the vehicle can compensate by reducing its ability to accelerate. Different classifications can enable or disable different ADAS features as well.

Entertainment, information sharing, and climate control can also be based on the classification(s). Someone determined to be of a certain age range or with certain driving or speaking habits may enjoy certain genres of music or certain types of information or news or certain volume levels while driving. Also, users of certain demographics or psychographics may prefer a warmer or cooler climate in the vehicle.

Some embodiments can include a vehicle or a system within a vehicle. For example, some embodiments can include a vehicle with at least a body and a powertrain. And, such embodiments and others can include a system for selectively enabling or disabling vehicle features based on driver or user classification. Such a system can include one or more sensors that are part of the vehicle and/or part of a mobile device. Such sensor(s) can sense biometric features of a user and/or a driver of the vehicle. The sensors can also derive corresponding biometric data based on the sensed biometric features.

For example, some embodiments can include a vehicle or a system of a vehicle that includes at least one sensor for sensing a biometric feature of a user or driver (such as a biometric sensor) and electronic circuitry (such as a computing system) to process data sent from the at least one sensor. The at least one sensor can be configured to generate biometric data of at least one biometric feature of a user or driver of a vehicle having a plurality of first features in operating the vehicle and at least one second feature in operating the vehicle. The electronic circuitry can be configured to receive the biometric data sent from the at least one sensor. And, the electronic circuitry can be configured to determine a classification of the user or driver based on the sent biometric data, as well as determine, based on the classification, whether to enable or disable the second feature for the user operating the vehicle with the first features. The electronic circuitry can then enable or disable the second feature accordingly.

The at least one sensor can be configured to sense the at least one biometric feature of the user or driver of the vehicle, and send the biometric data associated with the sensed at least one biometric feature. The data can be sent to a requester such as the electronic circuitry. The electronic circuitry can be configured to request and receive the biometric data from the at least one sensor, and the determine the classification of the user based on the received data.

In some examples, the electronic circuitry can be configured to initially restrict the user or driver from using at least one certain feature of the vehicle. And, subsequently, the electronic circuitry can be configured to enable the user to use the at least one certain feature or continue to restrict the user from using the at least one certain feature according to the determined classification. On the other hand, in some examples, the electronic circuitry can be configured to initially allow the user or driver to use at least one certain feature of the vehicle. And, subsequently, the electronic circuitry can be configured to disable the user from using the at least one certain feature or continue to allow the user to use the at least certain feature according to the determined classification.

Based on classification, certain driving control aspects can be disabled, enabled, or adjusted. The driving aspects can include driving configurations and preferences adjustable from a controller via automotive electronics (such as adjustments in the transmission, engine, chassis, passenger environment, and safety features via respective automotive electronics). The driving aspects can also include typical driving aspects and/or drive-by-wire aspects, such as giving control to steering, braking, and acceleration of the vehicle.

In some embodiments, based on classification, a passenger can be given control of passenger and/or driver comfort aspects (e.g., seat position and/or seat shape adjustments, air temperature and other air conditions, seat temperature), non-driving features (e.g., heating and conditioning of windows, mirrors, and wipers, window positioning, as well as door, glove compartment, and trunk locking and unlocking, and lighting), entertainment or infotainment systems, navigation systems, telephone systems, and other electronic integrated cockpit systems that do not control driving of the vehicle.

Also, based on classification, a driver or user can also be provided or restricted control to automated driving configurations and preferences. A user or driver can be provided or restricted control to set various levels of automation according to the SAE, such as control to set no automation preferences/configurations (level 0), driver assistance preferences/configurations (level 1), partial automation preferences/configurations (level 2), conditional automation preferences/configurations (level 3), high automation preferences/configurations (level 4), or full preferences/configurations (level 5). The user or driver can also be provided or restricted control to set driving mode such as sports or performance mode, fuel economy mode, tow mode, all-electric mode, hybrid mode, AWD mode, FWD mode, RWD mode, and 4WD mode.

Figure 2:
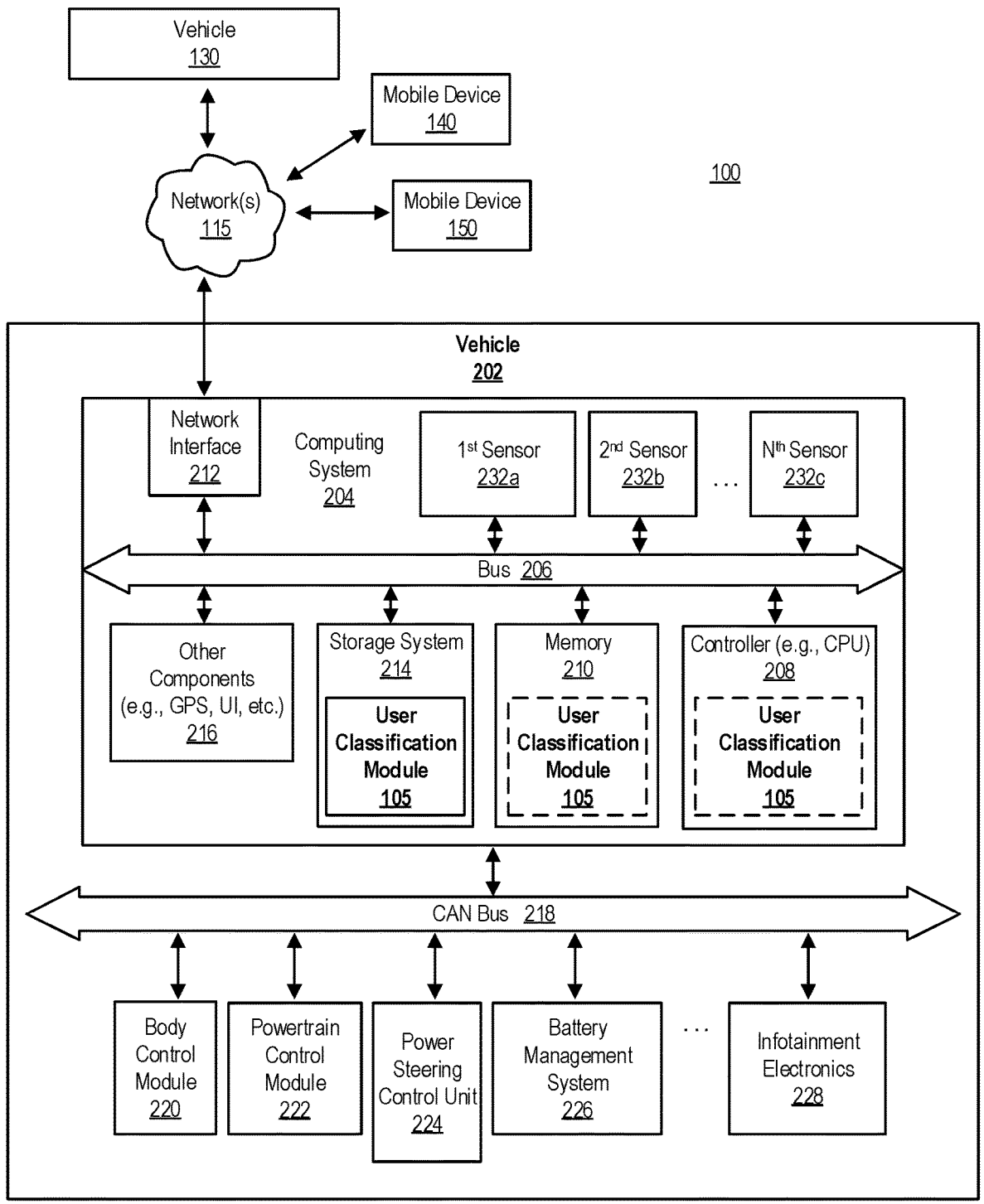
Figure 3:
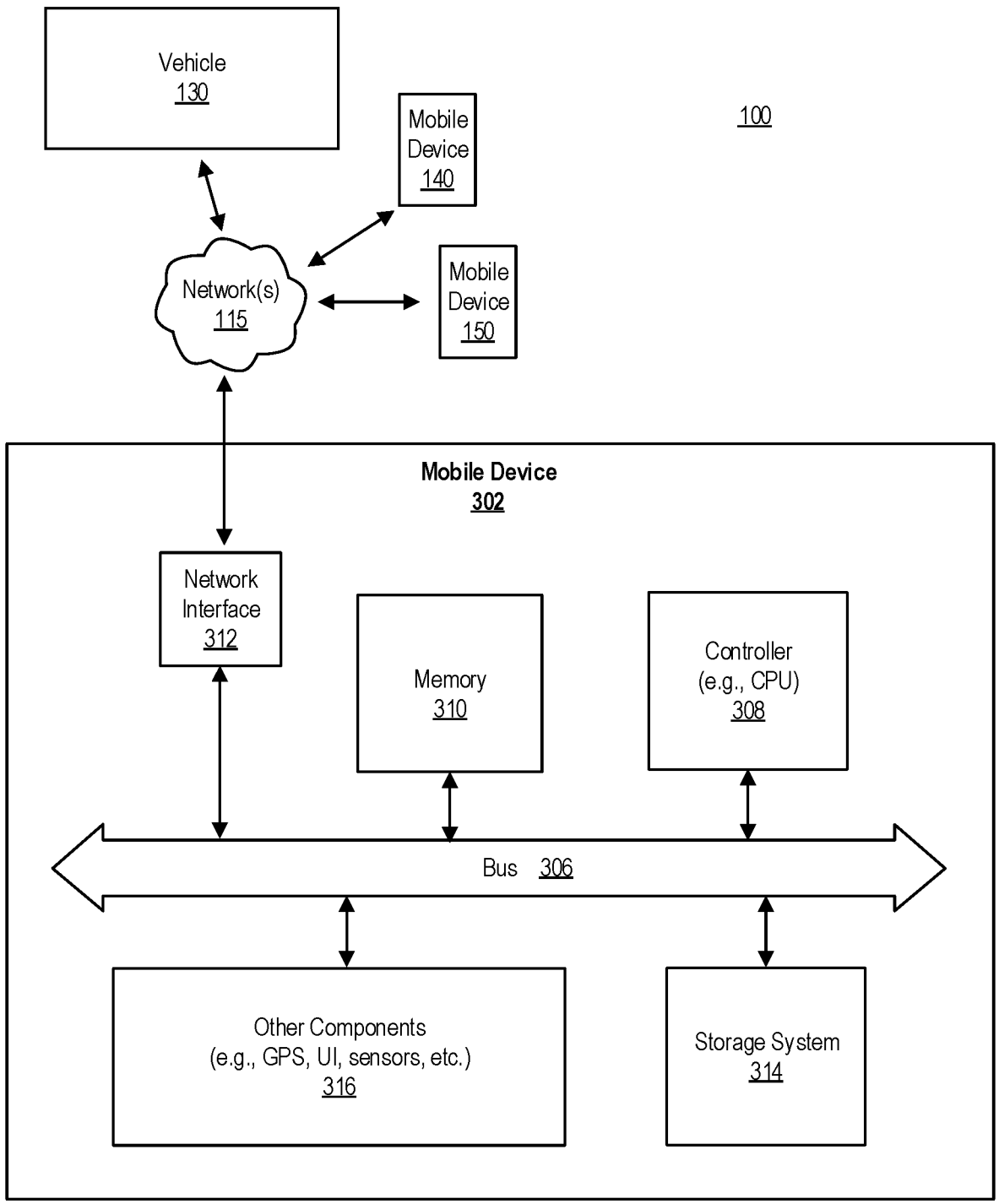

FIGS. 1 to 3 illustrate an example networked system 100 that includes at least mobile devices and vehicles (e.g., see mobile devices 140, 150, and 302 and vehicles 102, 202, and 130) and that is configured to implement selective enabling or disabling of vehicle features based on user or driver classification, in accordance with some embodiments of the present disclosure.

The networked system 100 is networked via one or more communications networks 115. Communication networks described herein, such as communications network(s) 115, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 150, and 302 and vehicles 102, 202, and 130) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see vehicle computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104 (including a user classification module 105), a body and controllable parts of the body (not depicted), a powertrain and controllable parts of the powertrain (not depicted), a body control module 110, a powertrain control module 112, a plurality of sensors (e.g., see sensors 116a, 116b, and 116c), and a controller area network (CAN bus) 114 that connects at least the vehicle computing system, the body control module, the powertrain control module, and the plurality of sensors to each other. Also, as shown, the vehicle 102 is connected to the network(s) 115 via the vehicle computing system 104. Also, shown, vehicle 130 and mobile devices 140 and 150 are connected to the network(s) 115, and, thus, are communicatively coupled to the vehicle 102.

The vehicle 102 includes vehicle electronics, including at least electronics for the controllable parts of the body and the controllable parts of the powertrain. The vehicle 102 includes the controllable parts of the body and such parts and subsystems being connected to the body control module 110. The body includes at least a frame to support the powertrain. A chassis of the vehicle can be attached to the frame of the vehicle. The body can also include an interior for at least one driver or passenger. The interior can include seats. The controllable parts of the body can also include one or more power doors and/or one or more power windows. The body can also include any other known parts of a vehicle body. And, the controllable parts of the body can also include a convertible top, sunroof, power seats, and/or any other type of controllable part of a body of a vehicle. The body control module 110 can control the controllable parts of the body.

Also, the vehicle 102 also includes the controllable parts of the powertrain. The controllable parts of the powertrain and its parts and subsystems are connected to the powertrain control module 112. The controllable parts of the powertrain can include at least an engine, transmission, drive shafts, suspension and steering systems, and powertrain electrical systems. The powertrain can also include any other known parts of a vehicle powertrain and the controllable parts of the powertrain can include any other known controllable parts of a powertrain.

The plurality of sensors (e.g., see sensors 116a, 116b, and 116c) of the vehicle 102 can include any type of sensor or camera configured to sense and/or record one or more biometric features or characteristics. A sensor of the vehicle 102 can also be configured to generate data corresponding to the one or more biometric features or characteristics according to the sensed and/or recorded biometric feature(s) or characteristic(s). A sensor of the vehicle 102 can also be configured to output the generated data corresponding to the one or more biometric features or characteristics. Any one of the plurality of sensors can also be configured to send, such as via the CAN bus 114, the generated data corresponding to the one or more biometric features or characteristics to the computing system 104 or other electronic circuitry of the vehicle 102 (such as the body control module 110 and the powertrain control module 112).

At least one or more of the sensors of the vehicle 102 can include, be, or be a part of a biometric device configured to verify and/or recognize an identity of a person based on one or more physiological or behavioral characteristics. Such characteristics can include fingerprints, facial images, iris recognition, and voice recognition, just to name a few. The biometric device can include, be, or be a part of a chemical biometric device, a visual biometric device, a temperature-based biometric device, a behavioral biometric device, an olfactory biometric device, or an auditory biometric device, or any combination thereof. Also, the mobile devices and other vehicles described herein, can include such sensors and/or biometric devices. And, for example, such sensors and/or biometric devices can be attached to a body of a vehicle.

In some embodiments, classification of a user or driver of a vehicle may include using behavioral data based on user or driver interaction with UI of the vehicle. UI of the vehicle can include any control in the vehicle, such a driving and non-driving controls. UI of the vehicle can also include a tactile UI (touch), a visual UI (sight), an auditory UI (sound), an olfactory UI (smell), an equilibria UI (balance), or a gustatory UI (taste), or any combination thereof. And, in other embodiments, classification of a user or driver of a vehicle can include a combined use of biometric data and data from user or driver interaction with UI of the vehicle. And, in some other embodiments, classification of a user or driver of a vehicle may only include use of biometric data. And, in some embodiments, non-biometric data or elements can be used in the classification of a user or a driver. Non-biometric data or elements can include PINs (e.g., touch input, combinations of PINs, etc.), keys, wireless remote keys, RFID via a chip, MAC address (e.g., MAC address of a mobile computing device), etc. Non-biometric data or elements can also include or be in the form of usernames, passwords, tokens, other types of mobile device identifiers and credentials, etc. Non-biometric data or elements can also include information about the mobile device of the user or driver, such as information on the type of device, the brand of the device, the age of the device, software on the device, multi-media on the device, etc. The classification of the user or driver of a vehicle can include intelligent multi-factor classification. Intelligent multi-factor classification can be beneficial because it can increase the reliability of a classification. For example, one parameter of the classification may fail to provide a valid classification, so multiple factors used and combined and processed via AI to determine one or more classifications of the user or driver can be more reliable. Also, a combination of classification methods may be sufficient to classify the user or driver to a certain level of confidence. Some of the systems may not be allowed to classify the user or driver alone. Multi-factor classification that uses combined data of multiple classification methods can be considered intelligent multi-factor classification. And, such combined data can be used to confirm the classification of a user or driver when the outputs of the multi-factor classification combined (the combined data) shows a likelihood of the user or driver being a certain one or more classifications of a user or driver.

Information from different classification systems can have different weights; and, information from different systems can allow for different degrees of deficiencies in the combined classification data. Also, in some embodiments, implementation of the multi-factor classification can include a decision tree or weighted formula.

Also, in some embodiments, machine learning and artificial intelligence can be used in one of the combined classification methods or processing at later data processing stages of the intelligent multi-factor classification. The artificial intelligence can include use of an ANN. And, use of the ANN or another form of AI can include training the ANN or other form of AI to recognize a valid user or driver classification more effectively and/or efficiently over time and further use of the vehicle. Also, since different vehicles have different usages, such systems can be trained differently to have different requirements for user or driver classification.

The computing system 104 includes electronic circuitry and can include an electronic control unit (ECU), and can be configured to receive biometric data from the one or more of the plurality of sensors of the vehicle 102. Also, the computing system 104 can be configured to receive non-biometric data from non-biometric data sources such as a mobile device (e.g., see mobile devices 140 and 150) or a computing device of the vehicle 102. Also, the computing system 104 can be configured to receive data corresponding to user interactions with UI of the vehicle 102. Also, the computing system 104 can be configured to receive biometric data from other biometric data sources other than the sensors of the vehicle 102 such as from sensors of a mobile device.

The data for classification of the user or driver received from such sources by the computing system 104 can be associated with the user or driver. For example, the computing system 104 can be configured to associate the received data with the user or driver. Also, the computing system 104 can be configured to determine and confirm a classification of the user or driver according to at least the received data. In some examples, the electronic circuitry can also be configured to generate a first confidence score based on a comparison of a known first feature of a classification of a user or driver and a first feature in the received data associated with the user or driver of the vehicle, as well as generate a second confidence score based on a comparison of a known second feature of a classification of a user or driver and second feature in the received data associated with the user or driver of the vehicle. The electronic circuitry can also be configured to generate a combined confidence score based on at least the generated first and second confidence scores and confirm a classification of the user when the generated combined confidence score exceeds a confidence threshold. In such embodiments and others, the electronic circuitry can be configured to generate at least one of the confidence scores using at least one ANN. The input of the at least one ANN can include at least the received data or a derivative thereof. Also, the electronic circuitry can be configured to train the at least one ANN over time to increase effectiveness and/or efficiency of the at least one ANN for the user.

Some embodiments can include a vehicle (such as vehicle 102) or a system within, attached, or proximate to a vehicle. For example, some embodiments can include a vehicle with at least a body and a powertrain. Such embodiments and others can include a system that includes at least one sensor (e.g., see sensors 116a, 116b, and 116c), configured to generate biometric data of at least one biometric feature of a user of a vehicle. The vehicle can have a plurality of first features in operating the vehicle and a second feature in operating the vehicle. The system can also include electronic circuitry (such as electronic circuitry of the user classification module 105 of the computing system 104), configured to receive the generated biometric data from the at least one sensor. The electronic circuitry (such as via the user classification module 105) can also be configured to determine a classification of the user based on the received biometric data. The electronic circuitry can also be configured to determine, based on the classification, whether to enable or disable the second feature for the user. Also, the electronic circuitry can be configured to enable the second feature when it is determined to enable the second feature, and disable the second feature when it is determined to disable the second feature. In such embodiments and others, the electronic circuitry (such as via the user classification module 105) can be configured to determine the classification of the user using an ANN. The input of the ANN can include the received biometric data. And, the ANN can be trained via machine learning. The machine learning can be executed by the user classification module 105.

In such embodiments and others, the second feature can include the powertrain of the vehicle. And, when the determined classification includes the user being under a legal age to drive the vehicle, the electronic circuitry disables the second feature. Also, the second feature can include a safe driving mode of the vehicle. And, for example, wherein when the determined classification includes the user being under a preselected age, the electronic circuitry enables the second feature. Also, the second feature can include a safe driving mode of the vehicle. And, for example, wherein when the determined classification includes the user being over a preselected age, the electronic circuitry enables the second feature. The second feature also can include a feature of an infotainment system of the vehicle. And, for example, wherein when the determined classification includes the user being under a preselected age, the electronic circuitry disables the second feature. The second feature also can include an unlocking mechanism of at least one door of the body of the vehicle. And, for example, wherein when the determined classification includes the user being under a preselected age, the electronic circuitry disables the second feature. The second feature also can include a voice user interface of the vehicle. And, for example, wherein when the determined classification includes the user being under a preselected age, the electronic circuitry disables the second feature. Further, the second feature can include a safe driving mode of the vehicle. And, for example, wherein when the determined classification includes the user being intoxicated beyond a first intoxication threshold, the electronic circuitry enables the second feature. Also, the second feature can include the powertrain of the vehicle. And, for example, wherein when the determined classification includes the user being intoxicated beyond a second intoxication threshold, the electronic circuitry disables the second feature.

Such embodiments and others can include a system that includes at least one sensor, configured to sense at least one biometric feature of a user of a vehicle, and send biometric data associated with the sensed at least one biometric feature to electronic circuitry. And, such a system can include electronic circuitry configured to initially restrict the user from using at least one certain feature of the vehicle. Also, the electronic circuitry can be configured to receive the biometric data sent from the at least one sensor, and determine a classification of the user based on the received biometric data. The electronic circuitry also can be configured to subsequently permit the user to use the at least one certain feature or continue to restrict the user from using the at least certain feature according to the determined classification. Furthermore, such a system can include electronic circuitry configured to initially permit the user to use at least one certain feature of the vehicle. Also, the electronic circuitry can be configured to subsequently restrict the user to use the at least one certain feature or continue to permit the user to use the at least certain feature according to the determined classification.

In such embodiments and others, the at least one certain feature can include the powertrain of the vehicle; and, for example, wherein when the determined classification includes the user being under a legal age to drive the vehicle, the electronic circuitry continues to restrict the user from using the powertrain of the vehicle. Also, the at least one certain feature can include a safe driving mode of the vehicle; and, for example, wherein when the determined classification includes the user being under a preselected age, the electronic circuitry enables the safe driving mode. The at least one certain feature also can include a safe driving mode of the vehicle; and, for example, wherein when the determined classification includes the user being over a preselected age, the electronic circuitry enables the safe driving mode. Also, the at least one certain feature can include a feature of an infotainment system of the vehicle; and, for example, wherein when the determined classification includes the user being under a preselected age, the electronic circuitry continues to restrict the user from using the feature of the infotainment system. The at least one certain feature also can include an unlocking mechanism of at least one door of the body of the vehicle; and, for example, wherein when the determined classification includes the user being under a preselected age, the electronic circuitry continues to restrict the user from using the feature of the at least one door. The at least one certain feature also can include a voice user interface of the vehicle; and, for example, wherein when the determined classification includes the user being under a preselected age, the electronic circuitry continues to restrict the user from using the feature of the voice user interface. The at least one certain feature also can include a safe driving mode of the vehicle; and, for example, wherein when the determined classification includes the user being intoxicated beyond a first intoxication threshold, the electronic circuitry enables the safe driving mode. The at least one certain feature also can include the powertrain of the vehicle; and, for example, wherein when the determined classification includes the user being intoxicated beyond a second intoxication threshold, the electronic circuitry continues to restrict the user from using the powertrain of the vehicle.

In some embodiments, the electronic circuitry of a vehicle (e.g., see vehicles 102 and 202), which can include or be a part of the computing system of the vehicle, can include at least one of engine electronics, transmission electronics, chassis electronics, passenger environment and comfort electronics, in-vehicle entertainment electronics, in-vehicle safety electronics, or navigation system electronics, or any combination thereof (e.g., see body control modules 110 and 220, powertrain control modules 112 and 222, power steering control unit 224, battery management system 226, and infotainment electronics 228 shown in FIGS. 1 and 2 respectively). In some embodiments, the electronic circuitry of the vehicle can include electronics for an automated driving system.

The computing system in some embodiments can be configured to perform one or more actions of the vehicle or control one or more actions of the vehicle (or disable or enable features of the vehicle), based on the one or more classifications of the user or driver. Such control (or disabling or enabling of features of the vehicle) can include control of (or disabling or enabling of) at least one electronic of the vehicle electronics of the vehicle, which can include control of (or disabling or enabling of) certain configuration and preference information used by certain electronics and control modules of the vehicle. The specific configuration and preference information can pertain to adjustments of the vehicle via automotive electronics (such as adjustments in the transmission, engine, chassis, passenger environment, safety features, etc. via respective automotive electronics). The specific configuration and preference information can also pertain to automated driving configurations and preferences. The specific configuration and preference information can pertain to the various levels of automation according to the SAE. Such information can pertain to no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5). The specific preference information can include driving mode preferences such as sports or performance mode, fuel economy mode, tow mode, all-electric mode, hybrid mode, AWD mode, FWD mode, RWD mode, 4WD mode, etc. The modes can be specific or general. On the other hand, the specific configuration information can include specific transmission configurations, engine configurations, chassis configurations, for the user for one or more vehicles. The specific configuration information can be based on the preference information. And the specific configuration information can adjust parts of the vehicle via respective electronics for the parts. The certain configuration and preference information can also pertain to in-car entertainment systems, automotive navigation systems, passenger conform systems, electronic integrated cockpit systems, etc.

In some embodiments, the computing system of the vehicle can include a central control module (CCM), central timing module (CTM), and/or general electronic module (GEM).

Also, in some embodiments, the vehicle can include an ECU, which can be any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake control module, and battery management system.

As shown in FIG. 2, the networked system 100 can include at least a vehicle 202 that includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 115 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204 that can include and implement the user classification module 105. The computing system 204 can be communicatively coupled to the network(s) 115 as shown. The computing system 204 includes at least a bus 206, a controller 208 (such as a CPU) that can execute instructions of the user classification module 105, memory 210 that can hold the instructions of the user classification module 105 for execution, a network interface 212, a data storage system 214 that can store instructions for the user classification module 105, and other components 216 (which can be any type of components found in mobile or computing devices such as GPS components, I/O components such various types of user interface components, and sensors as well as a camera). The other components 216 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The computing system 204 can also include sensor interfaces that are configured to interface sensors of the vehicle 202 (e.g., see sensors 232a, 232b, and 232c). The bus 206 communicatively couples the controller 208, the memory 210, the network interface 212, the data storage system 214, the other components 216, and the sensors as well as sensor interfaces in some embodiments. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the computer system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 115).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 115 via the vehicle computing system 204. Also, shown, vehicle 130 and mobile devices 140 and 150 are connected to the network(s) 115, and, thus, are communicatively coupled to the vehicle 202.

The vehicle 202 is also shown having the plurality of sensors (e.g., see sensors 232a, 232b, and 232c), which can be part of the computing system 204. In some embodiments, the CAN bus 218 can connect the plurality of sensors, the vehicle computing system 204, the vehicle body control module, the powertrain control module, the power steering control unit, the battery management system, and the infotainment electronics to at least the computing system 204. The plurality of sensors can be connected to the computing system 204 via sensor interfaces of the computing system.

In some embodiments, the computing system 204 can include, be, or be a part of an electronic device configured for installation into a vehicle that includes one or more interfaces for sensors. For example, the electronic device can include a first interface configured to receive first biometric data from a sensor attached to the vehicle. The electronic device can also include a second interface configured to receive second biometric data from a mobile device (e.g., see network interface 212 and mobile devices 140 and 150 shown in FIG. 2) and/or non-biometric data from the mobile device, when the mobile device is within a predetermined threshold distance from the sensor attached the vehicle.

As shown, the vehicle 202 also includes vehicle electronics, including at least electronics for the body and the powertrain of the vehicle as well as for other components of the vehicle. It can be inferred from FIG. 2 that the vehicle 202 includes at least the body, the body's interior (which can have seats and other interior furnishings), the powertrain, the climate control system, the infotainment system since corresponding electronics are shown as being a part of the vehicle 202. The body of the vehicle 202 includes at least a frame to support the powertrain as well as body electrical systems. A chassis of the vehicle 202 can be attached to the frame of the vehicle. The interior can provide seating for at least one driver or passenger. In other words, the interior can include one or more seats. The body can also include one or more doors and/or one or more windows. The body can also include any other known parts of a vehicle body. Also, the powertrain can include any other known parts of a vehicle powertrain.

In some embodiments, the body of the vehicle 202 can include doors and windows and an interior of the body can include seating, a dashboard, or center console, or any combination thereof. The body and the interior can also include or the vehicle 202 can also include passenger and driver comfort systems having climate control systems, or seat adjustment systems, or any combination thereof. The body and the interior can also include or the vehicle 202 can also include information and entertainment systems (or an infotainment system which is a combination of information and entertainment systems). As shown, the vehicle electronics of vehicle 202 can include electronics for the interior, the passenger and driver comfort systems, and the information and entertainment systems. And, in such embodiments, the set of components of the vehicle can include components of the interior, the passenger and driver comfort systems, or the information and entertainment systems, or any combination thereof. And, since the computing system 204 can be similar to the computing system 104, it can also be configured to, upon determining a classification of the user or driver, perform an action for the vehicle or control an action for the vehicle (or disable or enable a vehicle feature), which can include control of (or disabling or enabling of) the aforesaid electronics and components of the vehicle, based on the determined classification.

As shown in FIG. 3, the networked system 100 can include at least a mobile device 302. The mobile device 302, which can have somewhat similar structure and/or functionality as the computing system 104 or 204, can be connected to communications network(s) 115, and, thus, be connected to vehicles 102, 202, and 130 as well as mobile devices 140 and 150.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the mobile device 302 can be connected to communications network(s) 115 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 115 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors (such as biometric sensors) as well as a camera). The other components 316 can include one or more user interfaces (e.g., GUIs, auditory user interfaces, tactile user interfaces, etc.), displays, different types of sensors, tactile (such as biometric sensors), audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 115).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Also, as shown in FIG. 3, the mobile device 302 can include a computing system (e.g., see the bus 306, controller 308, the memory 310, the network interface 312, and the data storage system 314, which are all components of the computing system). The computing system of the mobile device 302 can be configured to retrieve biometric and/or non-biometric data from its user, itself, and its sensors (e.g., see other components 316), and then send the biometric and/or non-biometric data to a vehicle connected to the mobile device via its network interface and network(s) 115.

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle and/or mobile device depicted in FIGS. 1 to 3.

In FIG. 4, the method 400 begins at step 402 with sensing, by at least one sensor (such as at least one biometric sensor), at least one biometric feature of a user of a vehicle. The vehicle can have one or more first features in operating the vehicle and at least one second feature in operating the vehicle. At step 404, the method 400 continues with generating and sending, by the at least one sensor, biometric data of the at least one biometric feature of the user according to at least the sensed at least one biometric feature. At step 406, the method 400 continues with receiving, by electronic circuitry (such as electronic circuitry of a computing system), the biometric data from the at least one sensor. At step 408, the method 400 continues with determining, by the electronic circuitry, a classification of the user based on the biometric data. The determination of the classification can use AI such as an ANN. At step 410, the method 400 continues with determining, by the electronic circuitry, whether to enable or disable the second feature for the user operating the vehicle with the first features based on the classification. At step 412, the method 400 continues with enabling or disabling, by at least the electronic circuitry, according to the determination at 410.

FIG. 5 illustrates a flow diagram of example operations of method 500 that can be performed by aspects of the networked system depicted in FIGS. 1 to 3, in accordance with some embodiments of the present disclosure. For example, the method 500 can be performed by a computing system and/or other parts of any vehicle and/or mobile device depicted in FIGS. 1 to 3.

In FIG. 5, the method 500 begins at step 502 with sensing, by at least one sensor (such as at least one biometric sensor), at least one biometric feature of a user of a vehicle. At step 504, the method 500 continues with generating and sending, by the at least one sensor, biometric data of the at least one biometric feature of the user according to at least the sensed at least one biometric feature. At step 506, the method 500 continues with initially restricting, by electronic circuitry (such as electronic circuitry of a computing system), the user from using at least one certain feature of the vehicle. At step 508, the method 500 continues with receiving, by the electronic circuitry, the biometric data from the at least one sensor. At step 510, the method 500 continues with determining, by the electronic circuitry, a classification of the user based on the biometric data. At step 512, the method 500 continues with subsequently enabling the user to use the at least one certain feature or continue to restrict the user from using the at least certain feature according to the determined classification.

Figure 6:
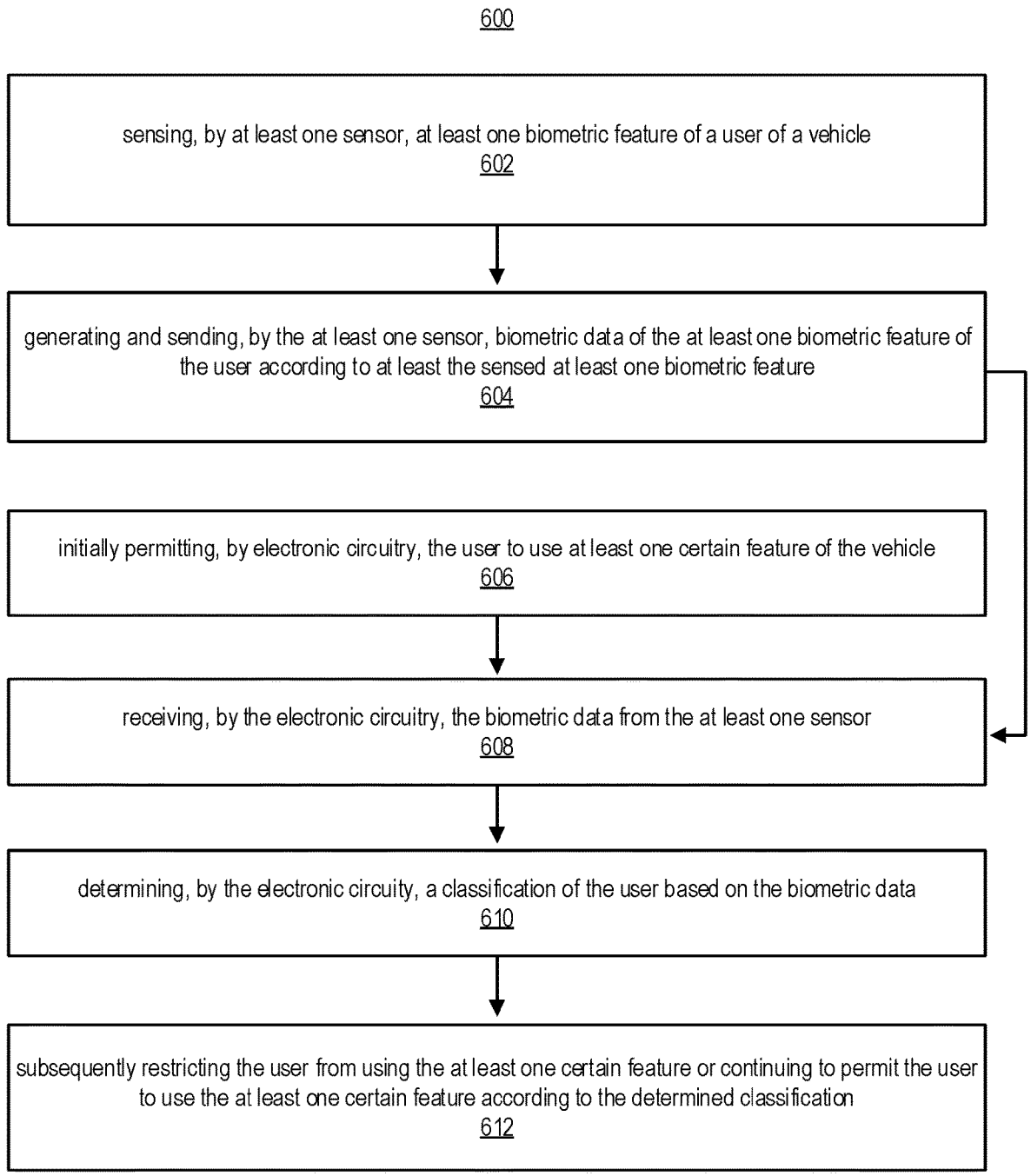

FIG. 6 illustrates a flow diagram of example operations of method 600 that can be performed by aspects of the networked system depicted in FIGS. 1 to 3, in accordance with some embodiments of the present disclosure. For example, the method 600 can be performed by a computing system and/or other parts of any vehicle and/or mobile device depicted in FIGS. 1 to 3.

In FIG. 6, the method 600 begins at step 602 with sensing, by at least one sensor (such as at least one biometric sensor), at least one biometric feature of a user of a vehicle. At step 604, the method 600 continues with generating and sending, by the at least one sensor, biometric data of the at least one biometric feature of the user according to at least the sensed at least one biometric feature. At step 606, the method 600 continues with initially permitting, by electronic circuitry (such as electronic circuitry of a computing system), the user to use at least one certain feature of the vehicle. At step 608, the method 600 continues with receiving, by the electronic circuitry, the biometric data from the at least one sensor. At step 610, the method 600 continues with determining, by the electronic circuitry, a classification of the user based on the biometric data. At step 612, the method 600 continues with subsequently restricting the user from using the at least one certain feature or continuing to permit the user to use the at least one certain feature according to the determined classification.

In some embodiments, it is to be understood that steps 402 to 412 or steps 502 to 512 or steps 602 to 612 can be implemented as a continuous process such as each step can run independently by monitoring input data, performing operations and outputting data to the subsequent step. Also, steps 402 to 412 or steps 502 to 512 or steps 602 to 612 can be implemented as discrete-event processes such as each step can be triggered on the events it is supposed to trigger and produce a certain output. It is to be also understood that each figure of FIGS. 4 to 6 represents a minimal method within a possibly larger method of a computer system more complex than the ones presented partly in FIGS. 1 to 3. Thus, the steps depicted in each figure of FIGS. 4 to 6 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, computers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
memory configured to store biometric data for at least one biometric feature of a user of a vehicle; and
electronic circuitry configured to:
operate a vehicle in a first state including enabling at least one feature;
receive the biometric data from at least one sensor;
receive, from the at least one sensor, data regarding characteristics associated with behavior of the vehicle as driven;
receive, from a mobile device within the vehicle, data regarding behavior of the user during interaction with a touch user interface of the mobile device;
determine a classification of the user based on the received biometric data, the vehicle behavior characteristics, and the behavior of the user during interaction with the touch user interface, wherein the classification is determined using an artificial neural network (ANN), and wherein inputs of the ANN comprise the received biometric data, and the data regarding behavior of the user during interaction with the touch user interface; and
change, based on the classification, operation of the vehicle to a second state, wherein in the second state the feature is disabled.

2. The system of claim 1, wherein the at least one sensor comprises one or more biometric sensors configured to detect one or more features of the user.

3. The system of claim 1, wherein the at least one feature comprises a powertrain of the vehicle, and wherein when the determined classification comprises the user being under a preselected age, the electronic circuitry causes disabling of the powertrain.

4. The system of claim 1, wherein when in the first state, the user is permitted to use the at least one feature, and when in the second state, the user is restricted from using the at least one feature.

5. The system of claim 1, wherein the at least one feature comprises an infotainment system of the vehicle, and wherein when the determined classification comprises the user being under a preselected age, the electronic circuitry causes disabling of the infotainment system.

6. The system of claim 1, wherein the at least one feature comprises an unlocking mechanism of at least one door of the vehicle, and wherein when the determined classification comprises the user being under a preselected age, the electronic circuitry causes disabling of the unlocking mechanism.

7. The system of claim 1, wherein the at least one feature comprises a voice user interface of the vehicle, and wherein when the determined classification comprises the user being under a preselected age, the electronic circuitry causes disabling of the at least one feature.

8. The system of claim 1, wherein the at least one feature comprises a powertrain of the vehicle, and wherein when the determined classification comprises the user being intoxicated beyond at least an intoxication threshold, the electronic circuitry causes disabling of the at least one feature.

9. An apparatus comprising:
at least one sensor configured to generate biometric data for at least one biometric feature of a user of a vehicle, the vehicle having a plurality of available features for operating the vehicle; and
electronic circuitry configured to:
operate the vehicle in a first state including enabling at least one first feature;
receive, from the at least one sensor, data regarding characteristics associated with behavior of the vehicle as driven;
receive, from a mobile device within the vehicle, data regarding behavior of the user during interaction with a touch user interface of the mobile device;
determine, based on the generated biometric data, the vehicle behavior characteristics and the behavior of the user during interaction with the touch user interface, a classification of the user, wherein the classification is determined using an artificial neural network (ANN), and wherein inputs of the ANN comprise the generated biometric data, and the data regarding behavior of the user during interaction with the touch user interface; and
change, based on the classification, operation of the vehicle to a second state, wherein in the second state the first feature is disabled.

10. The apparatus of claim 9, wherein the at least one first feature comprises a powertrain of the vehicle, and wherein when the determined classification comprises the user being under a preselected age to drive the vehicle, the electronic circuitry disables the at least one first feature.

11. The apparatus of claim 9, wherein when in the first state, the user is permitted to use the at least one first feature, and when in the second state, the user is restricted from using the at least one first feature.

12. The apparatus of claim 9, wherein the at least one first feature comprises a feature of an infotainment system of the vehicle, and wherein when the determined classification comprises the user being under a preselected age, the electronic circuitry disables the at least one first feature.

13. The apparatus of claim 9, wherein the at least one first feature comprises an unlocking mechanism of at least one door of the vehicle, and wherein when the determined classification comprises the user being under a preselected age, the electronic circuitry disables the at least one first feature.

14. The apparatus of claim 9, wherein the at least one first feature comprises a voice user interface of the vehicle, and wherein when the determined classification comprises the user being under a preselected age, the electronic circuitry disables the at least one first feature.

15. A method comprising:
operating a vehicle in a first state including enabling at least one first feature;
receiving, from at least one sensor, data regarding characteristics associated with behavior of the vehicle as driven;
collecting, by the at least one sensor, biometric data for a user of the vehicle;

receiving, from a mobile device within the vehicle, data regarding behavior of the user during interaction with a touch user interface of the mobile device;

determining, based on the vehicle behavior characteristics, collected biometric data, and the behavior of the user during interaction with the touch user interface, a classification of the user, wherein the classification is determined using an artificial neural network (ANN), and wherein inputs of the ANN comprise the collected biometric data, and the data regarding behavior of the user during interaction with the touch user interface; and disabling, based on the classification, the first feature.

* * * * *